(12) United States Patent
Bartholomew

(10) Patent No.: US 9,634,421 B2
(45) Date of Patent: Apr. 25, 2017

(54) WHILE-IN-USE DECK BOX

(71) Applicant: Thomas & Betts International, LLC, Wilmington, DE (US)

(72) Inventor: Paul J. Bartholomew, Somerville, TN (US)

(73) Assignee: Thomas & Betts International, LLC, Wilmington, DE (US)

( * ) Notice: Subject to any disclaimer, the term of this patent is extended or adjusted under 35 U.S.C. 154(b) by 43 days.

(21) Appl. No.: 14/682,463

(22) Filed: Apr. 9, 2015

(65) Prior Publication Data

US 2015/0295339 A1 Oct. 15, 2015

Related U.S. Application Data

(60) Provisional application No. 61/977,174, filed on Apr. 9, 2014.

(51) Int. Cl.

| | | |
|---|---|---|
| *H01R 13/447* | (2006.01) | |
| *H01R 13/52* | (2006.01) | |
| *H01R 25/00* | (2006.01) | |
| *H01R 13/44* | (2006.01) | |
| *H01R 13/50* | (2006.01) | |
| *H01R 35/04* | (2006.01) | |
| *H01R 24/78* | (2011.01) | |

(52) U.S. Cl.
CPC ....... *H01R 13/447* (2013.01); *H01R 13/5202* (2013.01); *H01R 25/006* (2013.01); *H01R 13/44* (2013.01); *H01R 13/501* (2013.01); *H01R 24/78* (2013.01); *H01R 35/04* (2013.01)

(58) Field of Classification Search
CPC ...... H01R 13/44; H01R 35/04; H01R 13/447; H01R 13/501
USPC ................... 439/131, 206; 124/48
See application file for complete search history.

(56) References Cited

U.S. PATENT DOCUMENTS

| | | | |
|---|---|---|---|
| 8,993,891 B2 * | 3/2015 | Drane | H05K 5/0239 16/2.1 |
| 2011/0177714 A1 * | 7/2011 | Byrne | H02G 3/185 439/535 |
| 2013/0078853 A1 * | 3/2013 | Dinh | H02G 3/088 439/535 |

OTHER PUBLICATIONS

Installation Instructions for Red Dot Deck Grommet, copyright 2013.

* cited by examiner

*Primary Examiner* — Abdullah Riyami
*Assistant Examiner* — Justin Kratt
(74) *Attorney, Agent, or Firm* — Hoffmann & Baron, LLP

(57) ABSTRACT

A while-in-use electrical box, such as a deck box, for providing power to an electrical device includes a frame having a door pivotally mounted therein. The frame is adapted to be mounted in a hole formed in a floor or deck. The door includes a bottom surface on which a receptacle housing is coupled. The receptacle housing includes walls which define an opening to receive an electrical socket device, such as an outlet. When in the closed position, the walls of the receptacle housing enclose the electrical socket device and extend beyond a front face of the electrical socket device to protect the socket from the weather.

20 Claims, 5 Drawing Sheets

WHILE-IN-USE DECK BOX

CROSS-REFERENCE TO RELATED APPLICATIONS

This application claims priority to U.S. Provisional Patent Application No. 61/977,174 filed on Apr. 9, 2014, the disclosure of which is incorporated herein by reference.

FIELD OF INVENTION

The present invention relates to a while-in-use electrical box for providing power to an electrical device. More specifically, the while-in-use electrical box is a weatherproof deck box mounted in an opening in the floor of a deck and can remain in the closed position even when an electrical device is plugged into the receptacle housed on the underside of the deck box.

BACKGROUND OF THE INVENTION

Outdoor decks are widely used in areas which serve as an extension of living space for houses. With decks being used more and more as outdoor living space, many individuals desire to have access to power for electrical devices, such as stereos, floor fans, lamps, laptops and various other devices. Unfortunately, long cords draped across a deck floor provide a tripping hazard. A convenient, safe and inconspicuous way of providing power for electrical devices such as those listed above is needed when being used on outdoor decks.

SUMMARY OF THE INVENTION

The present invention is an electrical box including a frame bounded by frame flange and a door pivotally attached to the frame and movable between an open and closed position. The door includes a top surface and a bottom surface, the top surface being substantially flush with the frame when the door is in the closed position. The electrical box further includes a receptacle housing coupled to the bottom surface of the door such that the receptacle housing moves together with the door, the receptacle housing being adapted to receive at least one electrical outlet. The receptacle housing includes walls defining an outlet opening, the walls extending beyond a front face of an outlet mounted therein and forming an open end. The open end of the receptacle housing faces in a downward direction when the door is in the closed position.

The electrical box further includes at least one slot located on the top surface of the door adapted to receive a cord from an electrical device. When the door is pivotally moved to the open position, the open end of the receptacle hosing is exposed to a user, and when the door is in the closed position, the open end of the receptacle housing is disposed below the frame.

The electrical box of the present invention further includes a receptacle housing open end which defines a plane and, when the door is on the open position, the plane is substantially obtuse to the frame and, when the door is in the closed position, the plane is substantially parallel to the frame. The receptacle housing interior preferably includes a mounting structure for securing the electrical outlet thereto. The walls of the receptacle housing extend beyond the mounting structure such that the electrical outlet is recessed into the receptacle housing. The electrical box also includes an electrical outlet cover plate mountable within the receptacle housing interior and adapted to cover a portion of the outlet opening such that the walls of the receptacle housing extend beyond the cover plate when the cover plate is mounted in the receptacle housing. The door preferably includes a latch to secure the door in the closed position. The door further includes a finger cut-out. Preferably, the door pivots to an angle of at least 90 degrees with respect to the frame.

The above and other features, aspects and advantages of the present invention will now be discussed in the following detailed description of preferred embodiments and appended claims, which are to be considered in conjunction with the accompanying drawings in which identical reference characters designate like elements throughout the views.

BRIEF DESCRIPTION OF THE FIGURES

FIG. 2 is a perspective view of a while-in-use deck box of the present invention in the open position with an electrical device cord plugged in.

FIG. 4 is a perspective view of a while-in-use deck box of the present invention in the closed position with an electrical device cord plugged in.

FIG. 5 is a side elevation view of a while-in-use deck box of the present invention in the closed position with an electrical device cord plugged in.

DETAILED DESCRIPTION OF THE INVENTION

The present invention provides a while-in-use electrical box, such as a deck box for providing power to an electrical device. The while-in-use deck box of the present invention eliminates the need for using extension cords to power electrical devices which otherwise must be plugged into traditional wall outlets mounted inside or outside of a home, which cords can present a tripping hazard. Additionally, the electrical box of the present invention can remain in a closed position when an electrical device is plugged in, and provides protection even when used in wet locations, such as an uncovered outdoor deck. The outlet or receptacle of the electrical box is preferably wired with a flexible power cord that runs under a deck and is connected to a fixed junction box for power. The receptacle or outlet is mounted within a receptacle housing provided on the underside of a door of the electrical box. When the door is lifted to an open position, the receptacle housing pivots up with the door so that the outlet is exposed to receive a plug of an electrical device. The door can be moved to a closed position, while at the same time allowing the plug to remain plugged into the receptacle. The cord of the electrical plug extends through a slot located on the door to exit the electrical box. When the deck box is in the closed position, gasketing is not needed to keep moisture away from the receptacle because the outlet and its interface with the plugged in cord is shrouded such that moisture from above will drain down and around the outlet and plugged in cord. Additionally, the arrangement of the slot for the plug of an electrical device also provides for a natural drip loop to be formed in an electrical cord when the box is closed, thus providing a path for water to drain down the cord of the plug and drip off before it can reach the outlet housed within the electrical box.

Figure 1:
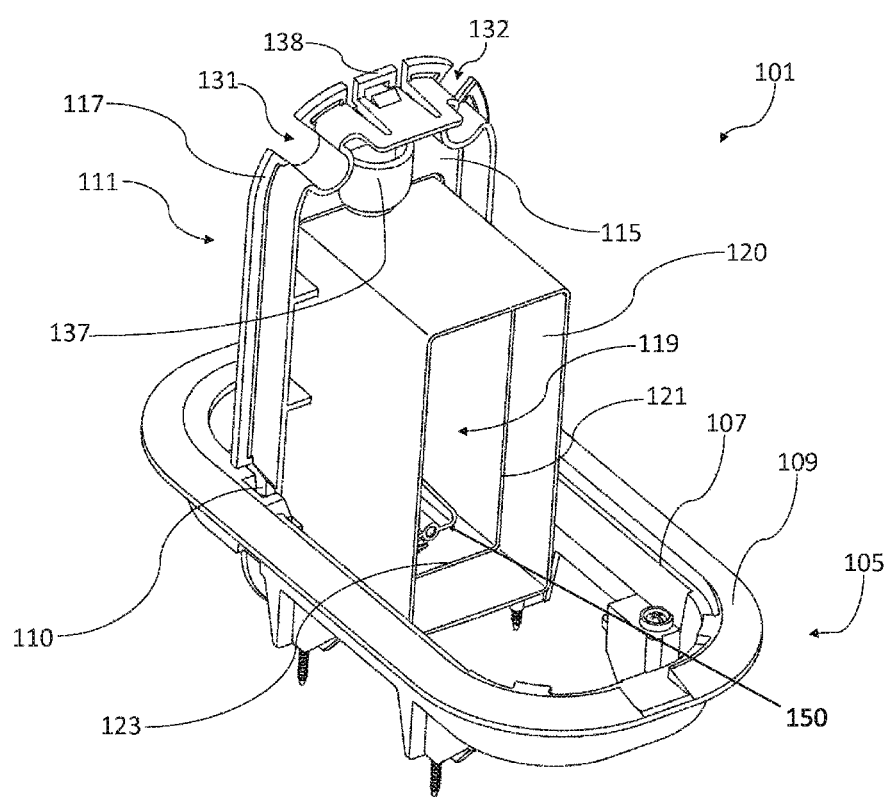
FIG. 1 is a perspective view of a while-in-use deck box of the present invention in the open position.
Figure 3:
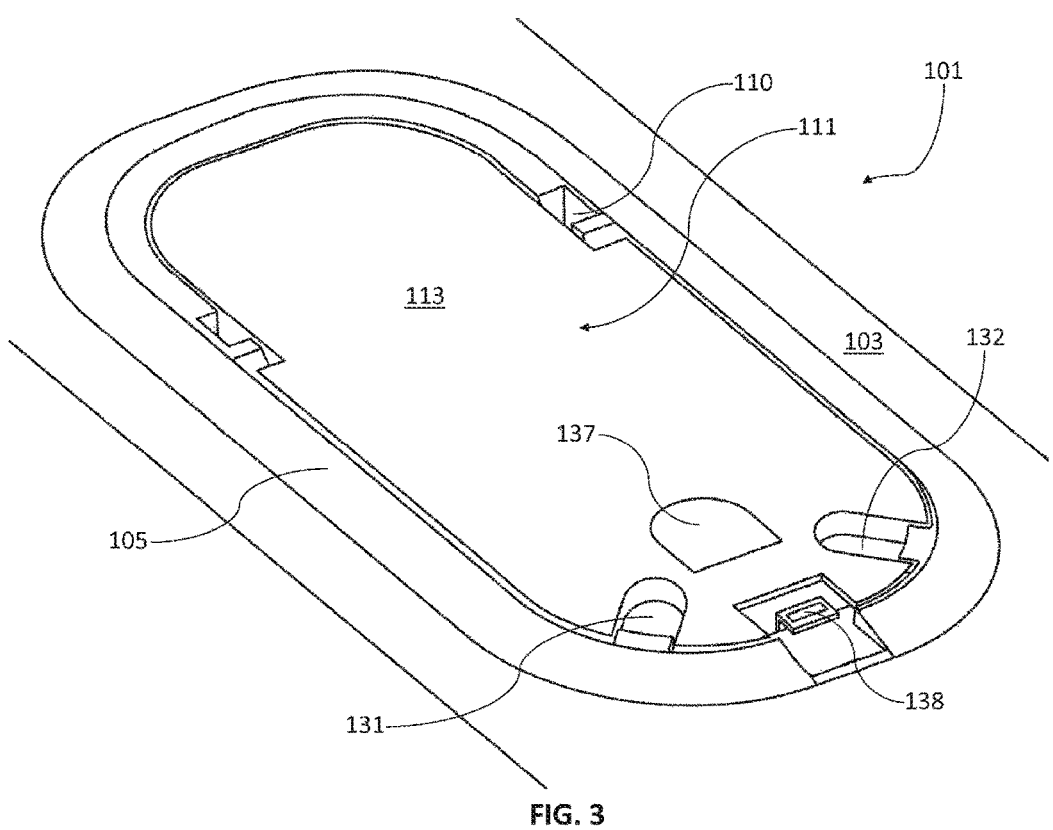
FIG. 3 is a perspective view of a while-in-use deck box of the present invention in the closed position.
Figure 4:
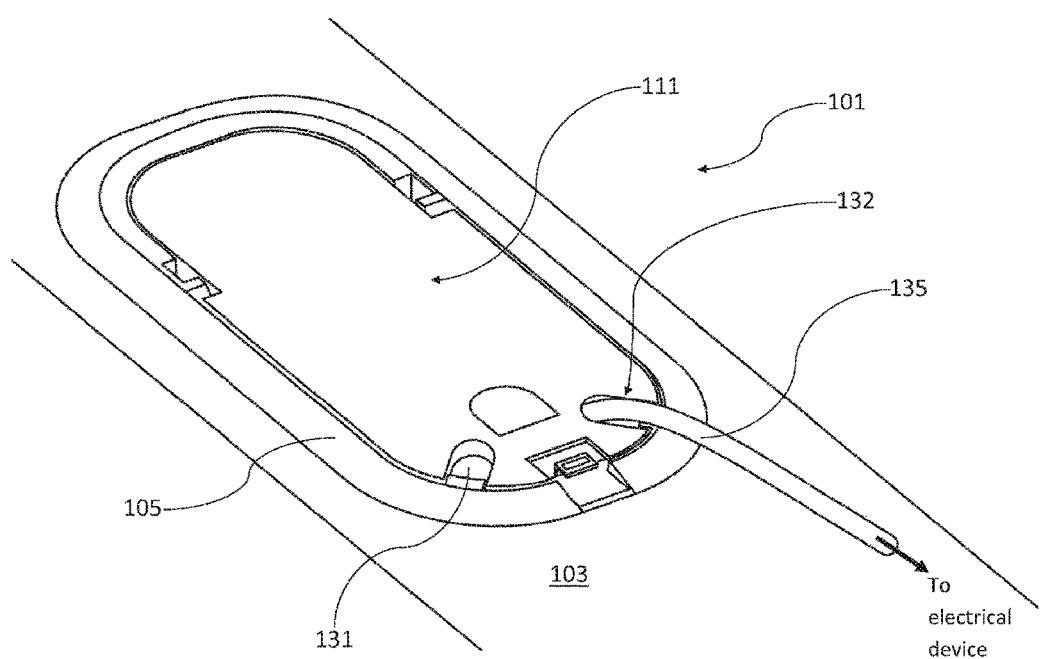
Figure 5:
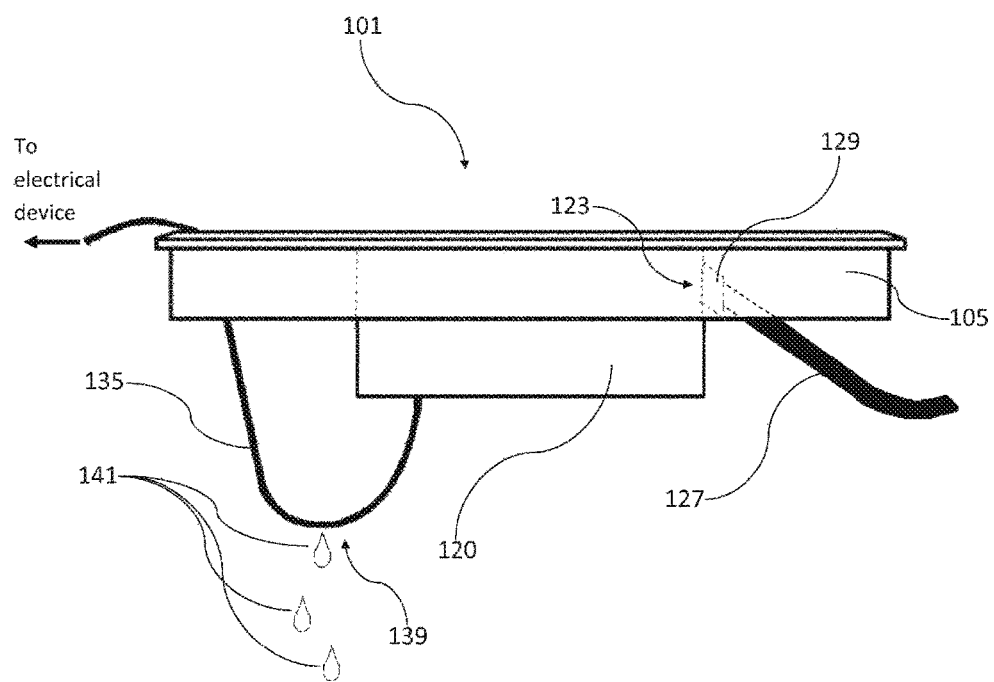

FIG. 1 illustrates a perspective view of a while-in-use electrical box 101, such as a deck box of the present invention in an open position. The deck box 101 is preferably weatherproof and is comprised of a frame 105 and a door 111 which are pivotally attached to one another about a pivot attachment point 110. The frame 105 is adapted to fit into an opening (not pictured) which has been cut into a surface of a deck 103 or other elevated flooring. The frame 105 of the deck box 101 includes of a frame flange 109 around a perimeter thereof and is adapted to hold the electrical box within the floor hole. Internal to the flange 109, the frame includes an internal surrounding edge 107 of the frame extending from one pivot attachment point 110 to the other. The door 111 is comprised of a door top surface 113, a door bottom surface 115 and a door lip 117. The door lip 117 extends partially around the door 111, such that when the door 111 is in a closed position (such as shown in FIGS. 3-5), the door lip 117 rests upon the internal surrounding edge of the 107 of the frame so that the door top surface 113 is substantially flush with a top surface of the frame 105, as shown in FIGS. 3 and 4. It is understood that the electrical box 101 of the present invention is not limited to use on decks, but rather can be used in combination with any raised floor, particularly those typically exposed to weather and water.

As shown in FIG. 1, a receptacle housing or casing 120 is preferably integrally and fixedly coupled to the bottom surface 115 of the door 111. Since the receptacle housing 120 is integrally formed to the door bottom surface 115, the receptacle housing 120 moves in unison with the door 111 when it is moved between an open position and a closed position, or vice versa. The receptacle housing 120 is adapted to receive at least one electrical socket device, such as an outlet 125, shown installed in the receptacle housing 120 in FIG. 2. The outlet 125 is shown as a single gang outlet in FIG. 2, but it is understood that a multiple gang outlet may also be used to provide access for a plurality of electrical devices, with the entire electrical deck box 101 being sized appropriately to house the multi-gang outlet.

To protect the outlet 125 from weather and, particularly water, the receptacle housing 120 surrounds the receptacle receiving portion 119 in which the outlet 125 is mounted. This receptacle housing 120 allows any water (such as rainwater) that may collect on the surface of the deck to drain down and away from an outlet 125 mounted therein when the door is in the closed position. Any rainwater (or other fluid) which falls onto the electrical box 101 is free to flow through gaps and spaces between the door 111 and the frame 105 since no gasket seal is provided between the door 111 and frame 105. A gasket seal is not necessary because of the weatherproof protection offered by the receptacle housing 120 which surrounds the outlet 125.

As shown in FIG. 1, the receptacle housing 120 may include mounting means in the form of side walls 121 and end walls 123 adapted to receive the outlet 125 and a cover plate 152 for the outlet. The mounting means also includes receivers 150 for mounting the outlet 125 to the receivers via standard screws within the receptacle housing 120. Since the walls of the receptacle housing 120 extend beyond a front face of the outlet 125, any rainwater that drips through the door 111 and frame 105 is directed away from the outlet 125 which is recessed in the receptacle housing 120.

Figure 2:
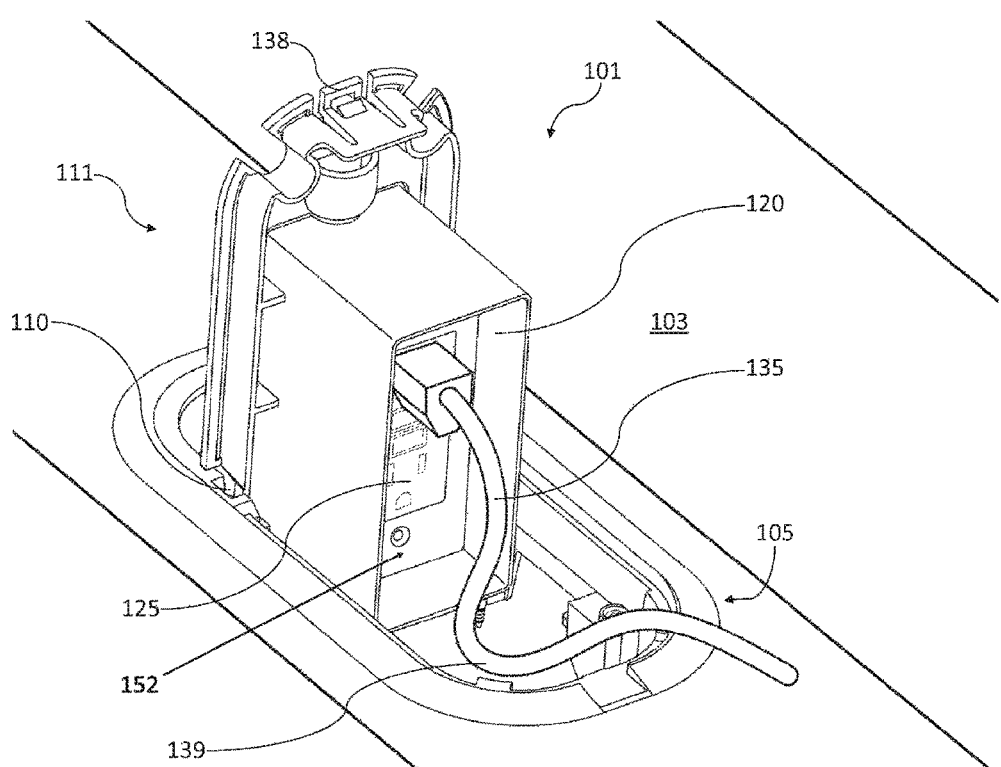

As shown in FIG. 2, is the electrical box 101 is illustrated in the open position with an electrical device cord 135 plugged into the outlet 125 mounted in the receptacle housing 120. As shown in FIGS. 2 and 5, the outlet 125 faces in the opposite direction from the top surface of the door, i.e., facing downward from the bottom surface of the door 111 in the closed position. The positioning of the outlet 125 facing downward in the closed position provides protection against water (such as rainwater) contacting the outlet 125 since water will drip down and away from the outlet due to gravity. Another feature of the electrical box 101 which prevents water from contacting the outlet 125 is a drip loop 139 as shown in FIG. 5 which is formed in the electrical device cord 135 when the cord 135 is plugged into the outlet 125. The beginning of the formation of the drip loop 139 is shown in FIG. 2, with the completed drip loop 139 shown formed in FIG. 5. The drip loop 139 formed in the electrical device cord 135 directs water droplets 141 away from the outlet 125.

As shown in FIG. 3, the electrical box 101 of the present invention is illustrated in a closed position. A door latch 138 is formed as part of the door 111 and cooperates with a mating latch receiver formed in the frame 105 which allows the door 111 to stay securely shut in place when it the closed position. Also shown in FIG. 3 is a finger cut-out 137 that is located in the door top surface 113. The finger cut-out 137 allows a user to lift the door 111 to the open position once the latch 138 is released. As previously mentioned, the door 111 opens by pivoting about the pivot attachment points 110 which connect the door 111 and the frame 105 of the electrical box 101.

FIG. 4 illustrates the electrical box 101 of the present invention in a closed position with an electrical device cord 135 plugged into the outlet 125 while still allowing the door 111 to remain in a completely closed position. The electrical device cord 135 is able to pass through the door 111 via a cord slot 132 and exits onto the deck surface 103 towards an electrical device which is being powered. Two cord slots 131 and 132 are shown in FIG. 4 to allow for multiple cords to exit the door 111 of the deck box 101 at once, but it is understood that more or fewer cord slots may be integrated into the door 111 of the deck box 101 while still achieving the same purpose of allowing electrical device cords 135 to be plugged into the outlet 125 with the door 111 remaining completely closed. The cord slots 131 and 132 are openings in the door 111 of the deck box 101 which allow rainwater (or other fluid) to flow through the cord slots 131 and 132 and onto the ground below. However, the rainwater (or other fluid) is not able to contact the outlet 125 which is surrounded by the receptacle housing 120. Also, if a cord is provided in the slot 131, 132, any water which drips down the electrical device cord 135 drips off the cord drip loop 139 and away from the outlet 125.

FIG. 5 is a side elevation view of the electrical deck box 101 of the present invention with an electrical device cord 135 plugged in. As shown in FIG. 5, outlet 125, which is covered by the receptacle housing 120, receives power through a flexible power cord 127 which may be connected to a fixed junction box mounted under the surface of the deck. The flexible power receptacle cord 127 is connected to the receptacle housing 120 through a receptacle cord aperture 129 which is located on an end wall 123 of the receptacle housing. The receptacle housing 120 and flexible power cord 127 are wired with appropriate fittings for use in wet locations and connected by typical methods to the fixed junction box. Preferably, the power cord 127 is flexible to allow for proper movement of the door 111 and does not hinder the opening or closing of the door 111.

Although the invention has been described in detail above, it is expressly understood that it will be apparent to persons skilled in the relevant art that the invention may be modified without departing from the spirit of the invention.

Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. An electrical box comprising:
a frame bounded by frame flange;
a door pivotally attached to the frame and movable between an open and closed position; the door having a top surface and a bottom surface, the top surface being substantially flush with the frame when the door is in the closed position;
a receptacle housing coupled to the bottom surface of the door such that the receptacle housing moves together with the door, the receptacle housing being adapted to receive at least one electrical outlet, the receptacle housing including walls defining an outlet opening, the walls extending beyond a front face of an outlet mounted therein and forming an open end, the open end facing in a downward direction when the door is in the closed position; and
at least one slot located on the top surface of the door adapted to receive a cord from an electrical device;
wherein when the door is pivotally moved to the open position, the open end of the receptacle housing is exposed to a user, and when the door is in the closed position, the open end of the receptacle housing is disposed below the frame.

2. The electrical box of claim 1, wherein the receptacle housing open end defines a plane and when the door is on the open position the plane is substantially obtuse to the frame and when the door is in the closed position, the plane is substantially parallel to the frame.

3. The electrical box of claim 1, wherein the receptacle housing interior includes a mounting structure for securing the electrical outlet thereto, and the walls extend beyond the mounting structure such that the electrical outlet is recessed into the receptacle housing.

4. The electrical box of claim 1, wherein the receptacle housing includes an electrical outlet cover plate mountable within the housing interior adapted to cover a portion of the outlet opening, and wherein the walls of the housing extend beyond the cover plate when the cover plate is mounted in the receptacle housing.

5. The electrical box of claim 1, wherein the electrical box is weatherproof and the door further comprises a latch to secure the door in the closed position.

6. The electrical box of claim 1, wherein an electrical outlet mounted in the receptacle housing is fully enclosed by the walls of the receptacle housing.

7. The electrical box of claim 1, wherein the door further includes a finger cut-out.

8. The electrical box of claim 1, wherein the door pivots to an angle of at least 90 degrees with respect to the frame.

9. An electrical box comprising:
a frame having a top end bounded by a flange member;
a door pivotally attached to the frame and movable between a first open position and a second closed position; the door having a top surface and a bottom surface, and the top surface including a lip portion that contacts the frame when the door is in the second closed position to maintain the door top surface substantially flush with a frame top edge;
a receptacle housing coupled to the bottom surface of the door such that the receptacle housing pivots with the door, the receptacle housing being adapted to receive at least one electrical socket device, the receptacle housing comprising walls defining an electrical socket device opening;
wherein when the door is in the first open position, a portion of the electrical socket device opening is disposed above the frame top edge, and when the door is in the second closed position the electrical socket device opening is disposed below the frame top edge and the electrical socket device opening faces downwardly and the door top surface faces upwardly.

10. The electrical box of claim 9, wherein the walls of the receptacle housing extend beyond an electrical socket device mounted therein and the walls terminate in an edge forming an open end.

11. The electrical box of claim 9, wherein the electrical box is weatherproof and there is no elastomeric gasket between the door and the frame.

12. The electrical box of claim 9, wherein the frame includes an edge recessed below the frame top surface, the door lip portion engaging the frame edge when in the second closed position.

13. The electrical box of claim 10, wherein a gap is provided between the door and the frame to allow water to pass through the gap.

14. A weatherproof electrical floor box comprising:
a frame having a top end bounded by an outwardly protruding flange adapted to be mounted in a hole in the floor;
a door pivotally coupled to the frame and movable between an open position and a closed position, the door having a top surface and a bottom surface, and the door including a lip portion that contacts the frame when the door is in the closed position such that the door top surface is substantially flush with a top of the frame;
a receptacle housing coupled to the bottom surface of the door wherein the receptacle housing moves with the door, the receptacle housing adapted to receive at least one electrical socket device mounted therein, the electrical socket device having a front face, the receptacle housing comprising walls defining an electrical socket device opening, wherein when the door is in the open position, at least a portion of the electrical socket device front face is disposed above the top of the frame and when the door is in the closed position, the electrical socket device front face is disposed below the frame and the electrical socket device front face faces downwardly and the door top surface faced upwardly.

15. The weatherproof electrical floor box of claim 14, wherein the electrical socket device is mounted within the receptacle housing and is operably connected to a power supply.

16. The weatherproof electrical floor box of claim 14, wherein door includes at least one slot adapted to receive a power cord of an electrical device.

17. The weatherproof electrical floor box of claim 14, wherein the walls of the receptacle housing extend beyond the electrical socket device front face such that the electrical socket device is recessed from an open end defined by the walls.

18. The weatherproof electrical floor box of claim 14, wherein a gap is provided between the door and the frame to allow water to pass through the gap.

19. The weatherproof electrical floor box of claim 18, wherein there is no elastomeric gasket between the door and the frame.

20. The weatherproof electrical floor box of claim 14, wherein the door pivots to an angle of at least 90 degrees with respect to the frame.

\* \* \* \* \*